(12) United States Patent
Iwai (10) Patent No.: US 8,760,590 B2
(45) Date of Patent: Jun. 24, 2014

(54) ATTACHMENT STRUCTURE FOR CONTROL KEY UNIT

(75) Inventor: Akio Iwai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1134 days.

(21) Appl. No.: 12/534,919

(22) Filed: Aug. 4, 2009

(65) Prior Publication Data

US 2010/0045880 A1   Feb. 25, 2010

(30) Foreign Application Priority Data

Aug. 20, 2008   (JP) ................. 2008-211262

(51) Int. Cl.
*H04N 5/64*   (2006.01)
(52) U.S. Cl.
USPC .......................................................... 348/836
(58) Field of Classification Search
USPC .......................................................... 348/836
See application file for complete search history.

(56) References Cited

U.S. PATENT DOCUMENTS

| 5,455,743 | A |   | 10/1995 | Miyajima |        |
|-----------|---|---|---------|----------|--------|
| 5,737,039 | A | * | 4/1998  | Lopez et al. | 348/836 |
| 5,742,359 | A | * | 4/1998  | Han      | 348/836 |

FOREIGN PATENT DOCUMENTS

| EP | 1 577 894 A2 | 9/2005 |
| JP | 61-54645 U | 4/1986 |
| JP | 06-036654 A | 2/1994 |
| JP | 2000-299567 A | 10/2000 |
| JP | 2005-191029 A | 7/2005 |

OTHER PUBLICATIONS

Extended European Search Report of corresponding EP Application No. 09 16 7424.2 dated Aug. 10, 2010.

* cited by examiner

*Primary Examiner* — Sath V Perungavoor
*Assistant Examiner* — James Pontius
(74) *Attorney, Agent, or Firm* — Global IP Counselors, LLP (57) ABSTRACT

A control key unit attachment structure includes a control key unit, a base component, a retainer, an engagement member, a board receiver, and a positioning member. A frame of the control key unit is placed on the base component. The retainer and the base component sandwiches the frame of the control key unit in a first direction of the frame therebetween. The engagement member engages with the frame of the control key unit. The board receiver and the engagement member clamp the frame of the control key unit in a second direction of the frame therebetween. The positioning member positions the frame of the control key unit with respect to the board receiver in a third direction of the frame.

12 Claims, 6 Drawing Sheets

ATTACHMENT STRUCTURE FOR CONTROL KEY UNIT

CROSS-REFERENCE TO RELATED APPLICATIONS

This application claims priority to Japanese Patent Application No. 2008-211262, filed on Aug. 20, 2008. The entire disclosure of Japanese Patent Application No. 2008-211262 is hereby incorporated herein by reference.

BACKGROUND OF THE INVENTION

1. Field of the Invention

The present invention generally relates to an attachment structure for a control key unit. More specifically, the present invention relates to an attachment structure for a control key unit to attach the control key unit to a cabinet of an audio-visual device, such as a television receiver.

2. Background Information

A conventional liquid crystal television receiver has a cabinet with a front cabinet and a rear cabinet. The front cabinet is rectangular when viewed from the front. The rear cabinet is coupled to the front cabinet. Key tops stick out from openings that are made at a plurality of locations aligned vertically in a side panel on one side of the front cabinet. The key tops are pressed by the user to set various modes. The key tops include a main power button, channel changing buttons, volume adjusting buttons, an external power switchover button, setup buttons, and other such necessary control buttons.

With the liquid crystal television receiver, a control key unit is attached to the side panel of the front cabinet.

The control key unit includes a wiring board and a frame. The wiring board is rectangular and vertically oriented. The frame is vertically oriented. The key tops are vertically arranged. The key tops are integrally formed from resin on the frame. The wiring board is temporarily fixed to the frame by positioning protrusions provided to the frame. The wiring board that is thus temporarily fixed is mounted to the frame with attachment screws. With the control key unit, a plurality of key switches mounted on the wiring board is individually disposed at the back of the key tops. The key tops stick out from a plurality of openings in the side panel of the front cabinet.

With the attachment structure for the control key unit, attachment tabs are provided to the ends of the frame in its lengthwise direction. The attachment tabs are fastened with attachment screws to bosses that are provided to the front cabinet, thereby attaching the control key unit to the side panel of the front cabinet. Therefore, it is absolutely necessary to use the attachment screws (two attachment screws, for example) to attach the control key unit to the front cabinet.

Meanwhile, various structures have been proposed in the past for attaching elements for performing operations, such as push buttons and control knobs, to a housing, casing, or the like without using any screws.

With a conventional structure, a plurality of buttons of a push-button cluster is positioned on a plurality of switches mounted on a wiring board and in a plurality of through-holes in a casing, respectively (see Japanese Laid-Open Patent Application Publication No. 2000-299567, for example). Specifically, with the structure, fitting holes, ribs with slits, or the like provided to the push-button cluster are combined with positioning pins, guide ribs, or the like provided to the casing having the through-holes, thereby positioning the buttons of the push-button cluster in the through-holes. Furthermore, slits provided to the wiring board are combined with ribs provided to the push-button cluster, thereby positioning the buttons of the push-button cluster at the switches.

With another structure, control buttons are attached to a casing without using any screws by installing ribs provided to control buttons on the bottom face of the casing, or engaging hooks provided to the ends of the ribs with slit grooves provided to the bottom face of the casing (see Japanese Laid-Open Patent Application Publication No. 2005-191029, for example).

With further another structure, a knob is attached from outside of a casing, which simplifies the attachment of the knob (see Japanese Laid-Open Patent Application Publication No. H6-36654, for example).

With further another structure, push buttons are mounted on a wiring board by engaging hooks provided to the push buttons with square attachment holes provided to a printed board on which push switches are mounted (see Japanese Laid-Open Utility Model Application Publication No. S61-54645).

With the attachment structure for the control key unit, when the attachment screws are used to attach the control key unit to the front cabinet, not only is the components cost higher because of the need for using the attachment screws, but the assembly process is more complicated because the time-consuming work of fastening the attachment screws has to be carried out. Accordingly, it is difficult to improve productivity.

In view of this, there is a need to be able to attach a control key unit to a television receiver by a simple method that does not entail the use of extra parts such as the attachment screws.

In regard to this, all of the above-mentioned structures merely propose a structure for directly attaching knobs or push buttons (as key tops) to a casing or wiring board. However, the structures cannot be directly employed as a structure for attaching the control key unit to a cabinet.

In view of the above, it will be apparent to those skilled in the art from this disclosure that there exists a need for an improved attachment structure for a control key unit. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a structure with which a control key unit can be attached to a cabinet of a television receiver without using attachment screws.

In accordance with one aspect of the present invention, a control key unit attachment structure includes a control key unit, a base component, a retainer, an engagement member, a board receiver, and a positioning member. The control key unit includes a wiring board, a key switch, and a frame. The key switch is disposed on the wiring board and electrically coupled to the wiring board. The frame has a push operated key top overlying the key switch with the frame being attached to a cabinet of a television receiver and supporting the wiring board. The base component supports the frame of the control key unit. The retainer is located on the cabinet of the television receiver. The retainer and the base component sandwiches the frame of the control key unit in a first direction of the frame therebetween. The engagement member is located on the cabinet of the television receiver. The engagement member engages with the frame of the control key unit. The board receiver is located on the cabinet of the television receiver. The board receiver and the engagement member clamp the frame of the control key unit in a second direction of the frame therebetween with the second direction being perpendicular to the first direction of the frame. The board receiver has an opening through which the key top of the frame extends to an outside of the cabinet of the television receiver. The positioning member positions the frame of the control key unit with respect to the board receiver in a third direction of the frame with the third direction being perpendicular to both the first and second directions of the frame.

With the control key unit attachment structure of the present invention, it is possible to provide a structure with which a control key unit can be attached to a cabinet of a television receiver without using attachment screws.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention are provided for illustration only and not for the purpose of limiting the invention as defined by the appended claims and their equivalents.

Figure 6:
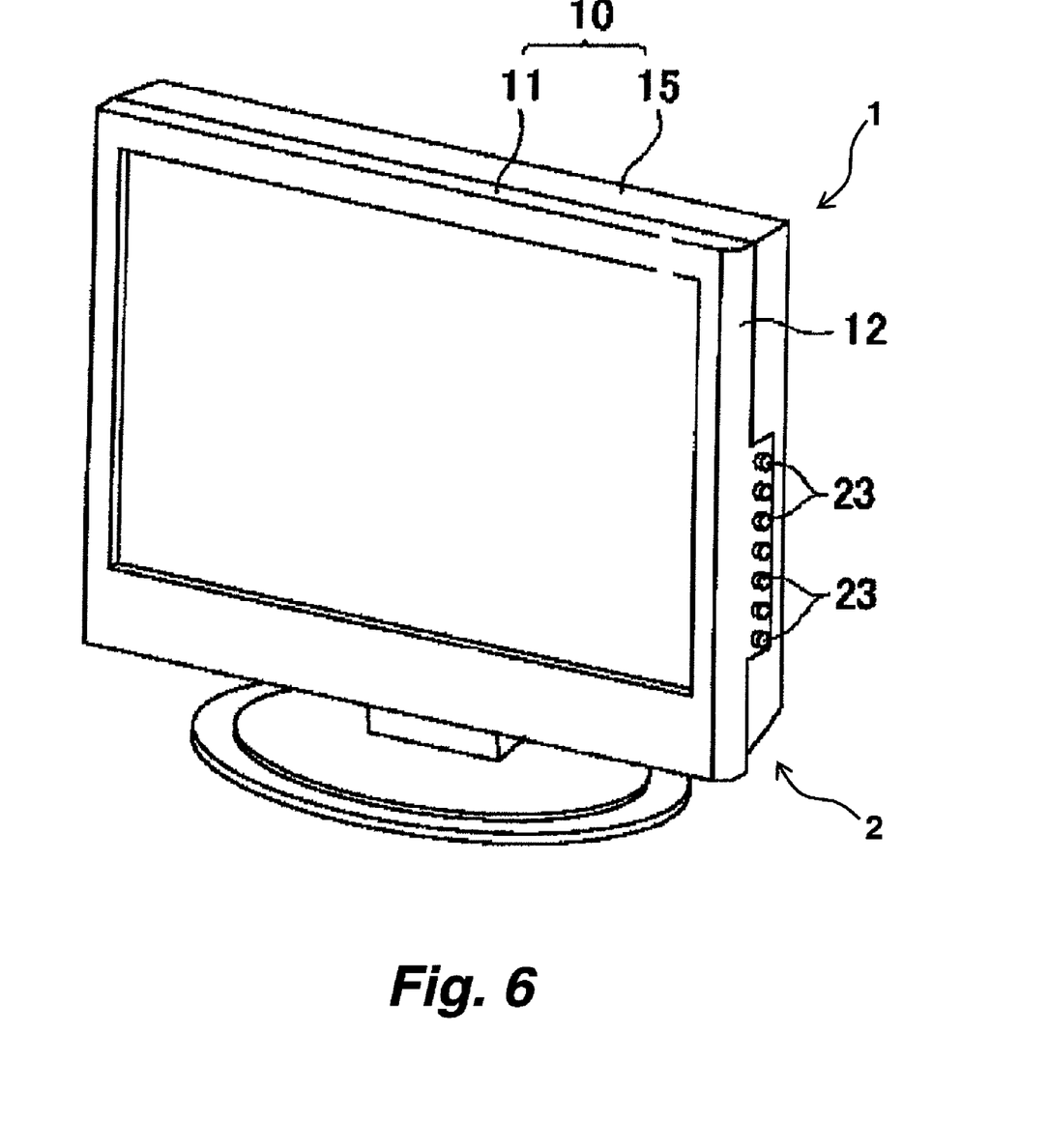
FIG. 6 is a perspective view of a liquid crystal television receiver having the attachment structure illustrated in FIG. 1.

FIG. 6 is a perspective view of a liquid crystal television receiver 1. The liquid crystal television receiver 1 has a cabinet 10 with a front cabinet 11 and a rear cabinet 15, an attachment structure 2 of a control key unit A, a liquid crystal module (not shown) and other electrical parts. The front cabinet 11 is rectangular when viewed from a front side of the cabinet 10. The rear cabinet 15 is coupled to the front cabinet 11. The liquid crystal module includes a liquid crystal panel to display image. The cabinet 10 houses the liquid crystal module within an inside space defined between the front cabinet 11 and the rear cabinet 15.

Figure 1:
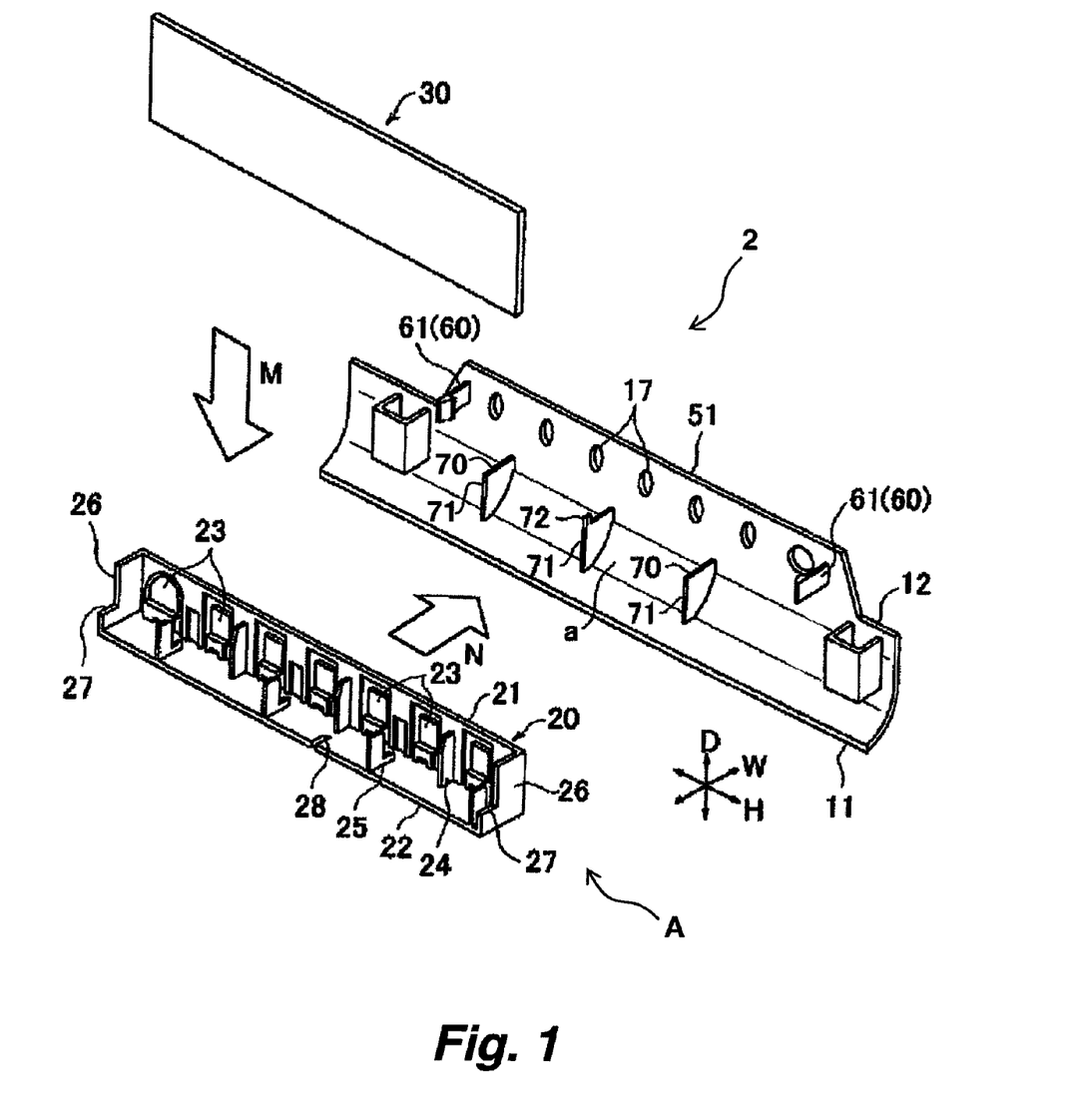
FIG. 1 is an exploded perspective view of an attachment structure having a control key unit and a front cabinet of a cabinet in accordance with one embodiment of the present invention as viewed from inside of the cabinet.
Figure 2:
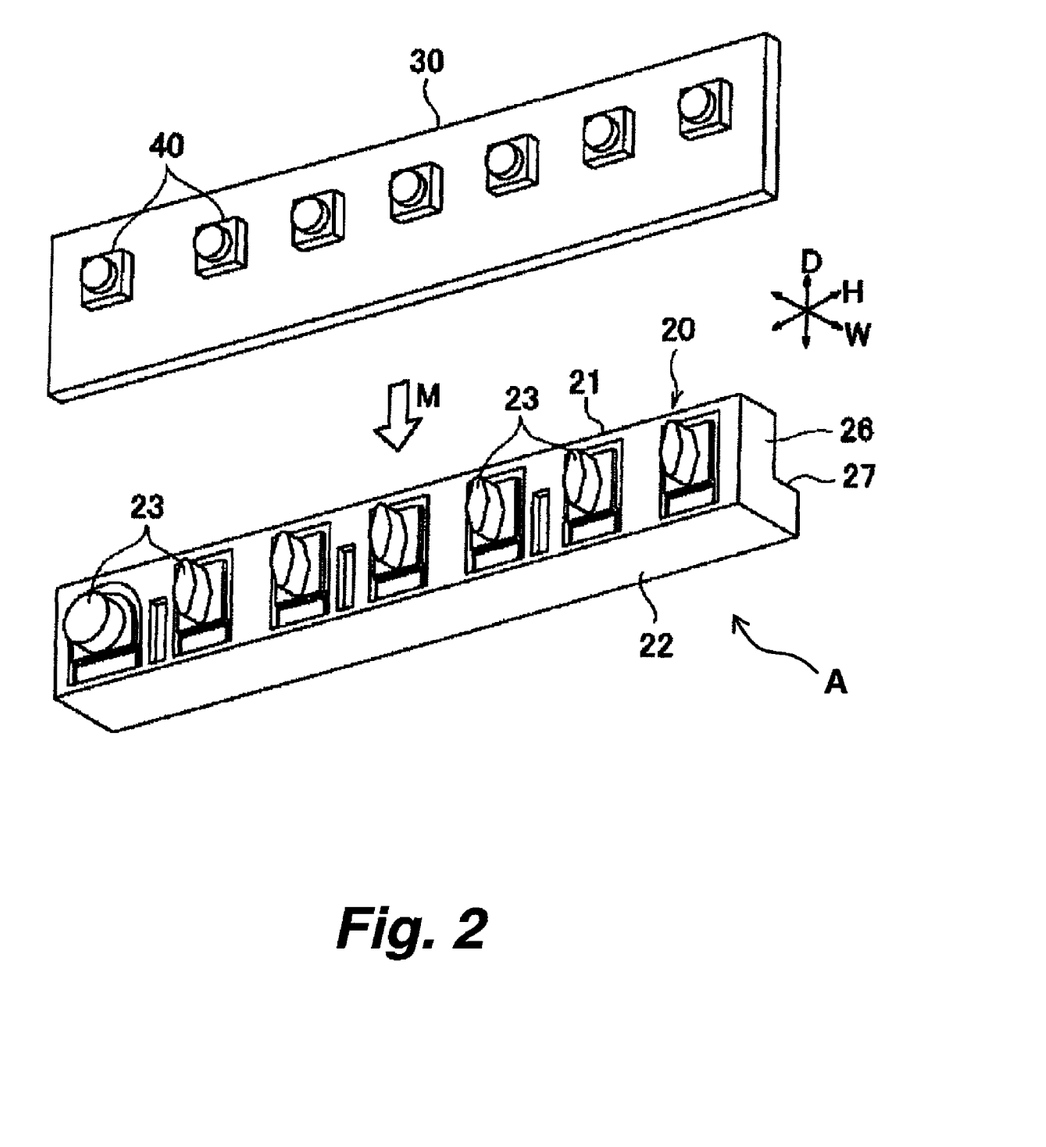
FIG. 2 is an exploded perspective view of the control key unit illustrated in FIG. 1.
Figure 3:
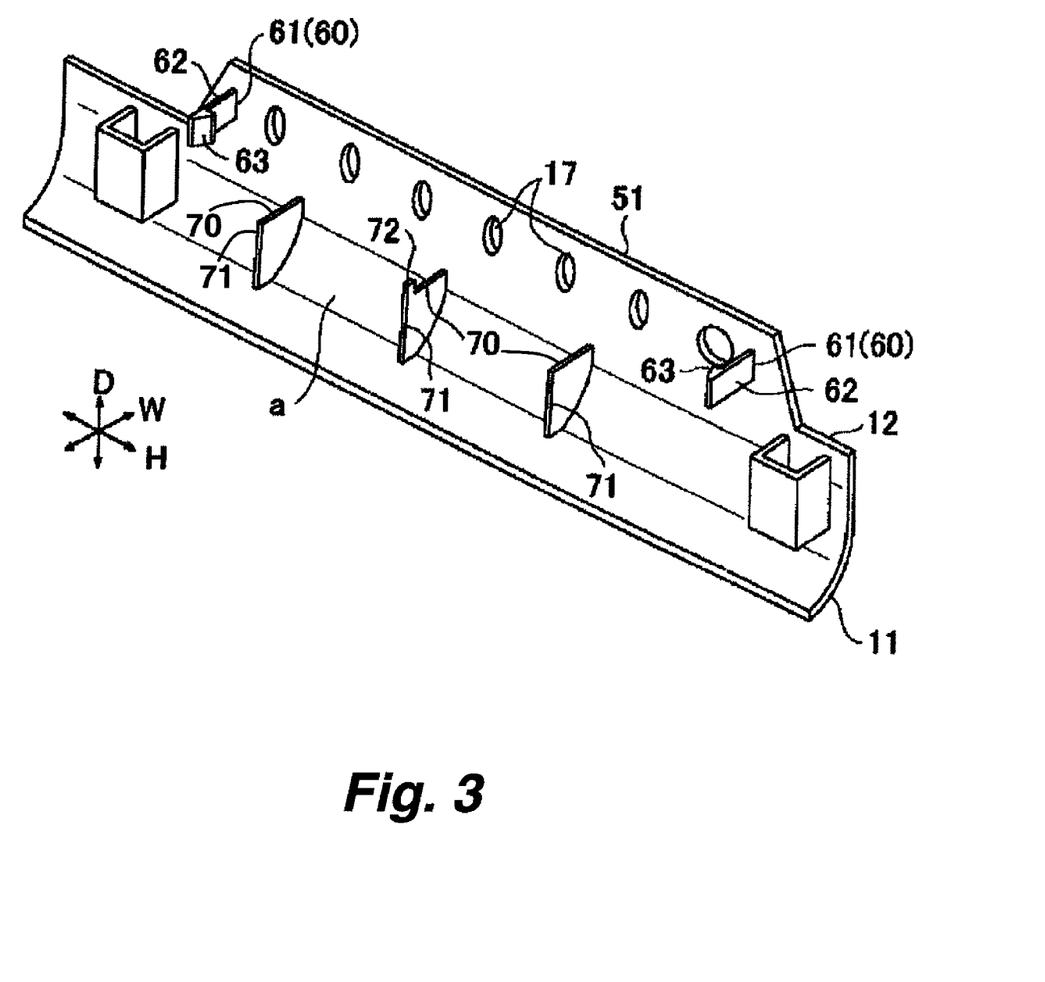
FIG. 3 is a detailed perspective view of the front cabinet as viewed from the inside of the cabinet.
Figure 4:
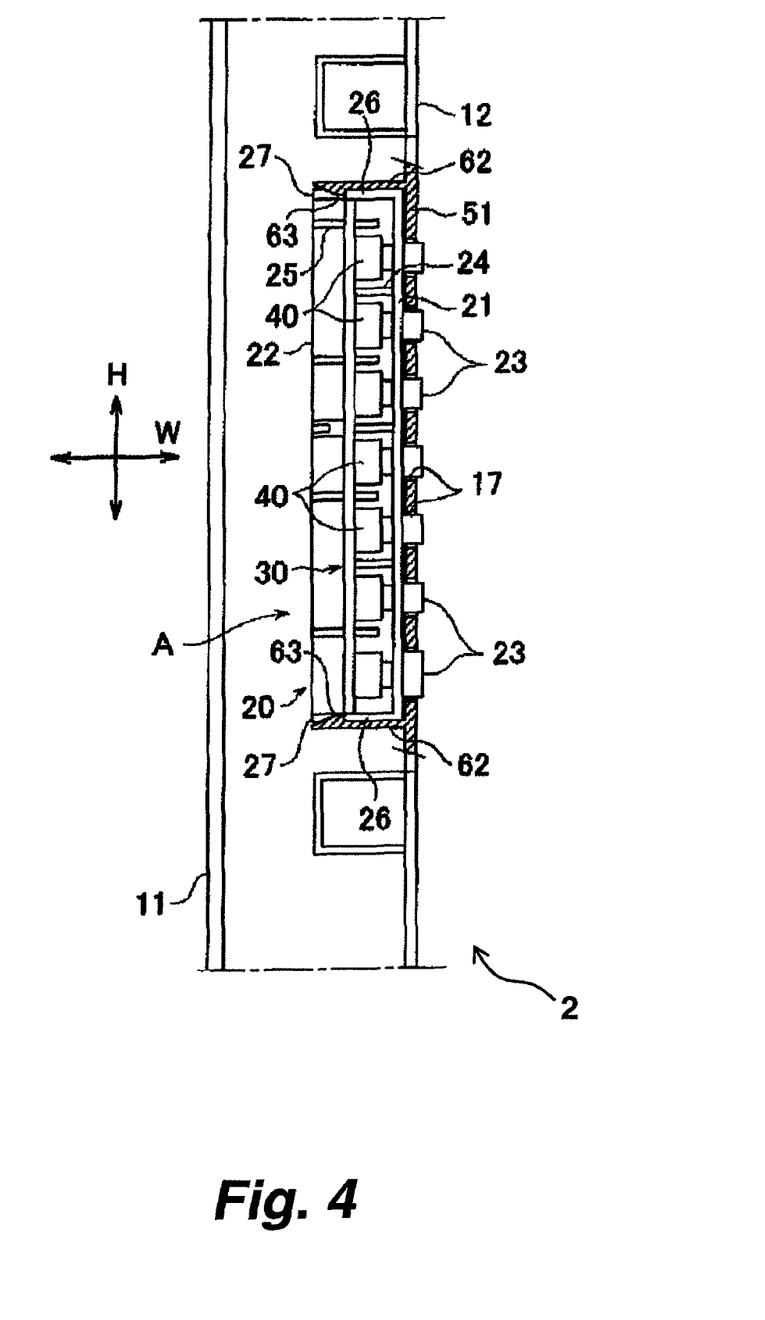
FIG. 4 is a partial cross sectional view of an attachment structure for the control key unit illustrated in FIG. 1.
Figure 5:
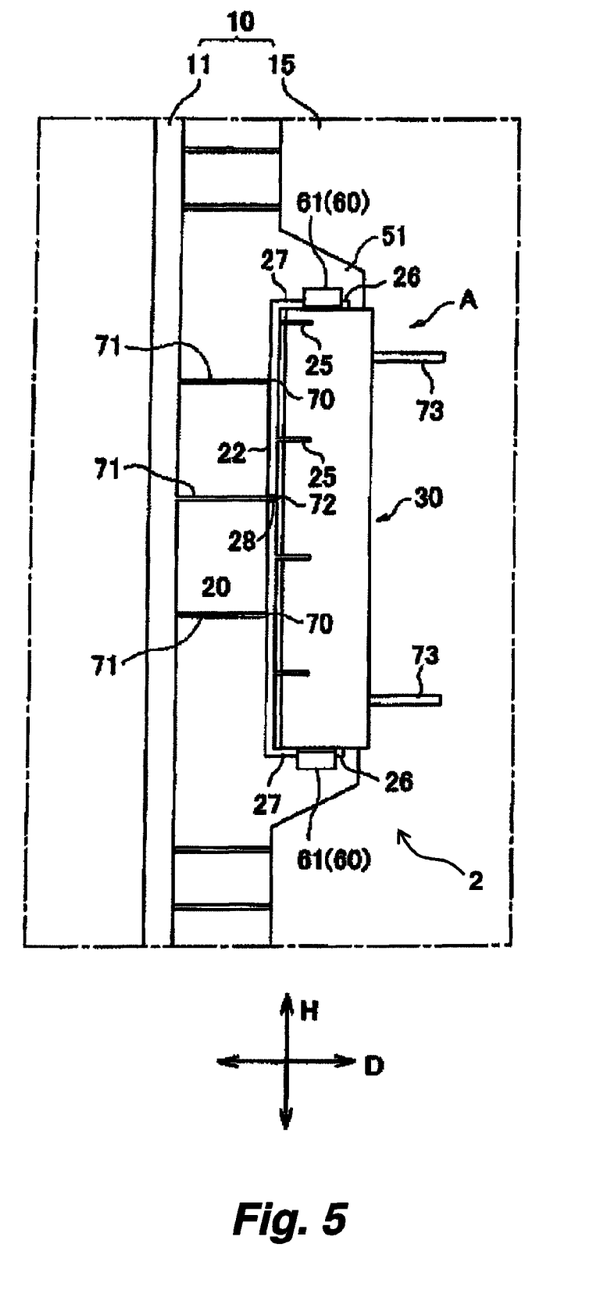
FIG. 5 is a side elevational view of the attachment structure as viewed from the inside of the cabinet.

FIG. 1 is an exploded perspective view of the control key unit A and the front cabinet 11 to which the control key unit A is attached, as viewed from the inside space of the cabinet 10. FIG. 2 is an exploded perspective view of the control key unit A. FIG. 3 is a detailed perspective view of the front cabinet 11 as viewed from the inside space of the cabinet 10. FIG. 4 is a partial cross sectional view of the attachment structure 2 for the control key unit A, as viewed from the inside space of the cabinet 10. FIG. 5 is a side elevational view of the attachment structure 2 as viewed from the inside space of the cabinet 10.

As shown in FIGS. 1 to 4, the control key unit A includes a frame 20, a wiring board 30 and a plurality of key switches 40. The frame 20 is a resin molding. The frame 20 is integrally formed as a one-piece, unitary member. The frame 20 is vertically oriented within the cabinet 10. The wiring board 30 is rectangular and vertically oriented within the cabinet 10. The key switches 40 are mounted in lengthwise alignment at a plurality of places on the wiring board 30. The frame 20 further has a front panel 21 and a bottom plate 22. The bottom plate 22 sticks out from one end of the front panel 21 in a width direction (e.g., lateral direction or second direction) W of the frame 20. The front panel 21 further has a plurality of pushable key tops (e.g., push operated key tops) 23 at a plurality of places of the front panel 21 in a height direction (e.g., lengthwise direction or third direction) H of the frame 20. The key tops 23 include a main power button, channel changing buttons, volume adjusting buttons, an external power switchover button, setup buttons, and other such necessary control buttons. The width direction W of the frame 20 is perpendicular to the height direction H of the frame 20. As shown in FIG. 1, when the frame 20 is attached to the front cabinet 11 of the cabinet 10, the width direction W and the height direction H of the frame 20 correspond to a width direction W and a height direction H of the front cabinet 11 of the cabinet 10. Furthermore, if this is the case, then a depth direction (e.g., thickness direction or first direction) D of the frame 20 corresponds to a depth direction of the front cabinet 11 of the cabinet 10. The depth direction D of the frame 20 is perpendicular to both the width direction W and the height direction H of the frame 20.

As shown in FIG. 1, the frame 20 further has a first rib array 24 and a second rib array 25. The first rib array 24 has a plurality of first ribs that are spaced apart at a specific spacing. The second rib array 25 has a plurality of second ribs that are similarly spaced apart at a specific spacing. The wiring board 30 is inserted in a direction of an arrow M shown in FIGS. 1 and 2 and clamped under light pressure in a space between the first rib array 24 and the second rib array 25. The key switches 40 are mounted on the wiring board 30. The key switches 40 are electrically coupled to the wiring board 30. The key switches 40 mounted on the wiring board 30 are located at a back side of the key tops 23 provided to the front panel 21 of the frame 20. In other words, the key tops 23 overly the key switches 40. Therefore, when one of the key tops 23 is pressed, respective one of the key switches 40 is reliably turned on and off by the key top 23.

Also, the frame 20 has a pair of end plates 26 at both ends of the frame 20. The end plates 26 serve to position the wiring board 30 relative to the frame 20 in the height direction H of the frame 20. Each of the end plates 26 further includes a protrusion 27 formed in a stepped shape.

As shown in FIG. 6, the cabinet 10 is divided into the front cabinet 11 and the rear cabinet 15. The front cabinet 11 and the rear cabinet 15 are put together and coupled to form the cabinet 10.

As shown in FIGS. 1 and 3, control key unit A is attached to the front cabinet 11. The front cabinet 11 has a side panel 12 with a board receiver 51. The board receiver 51 (a part of the side panel 12) sticks out in the depth direction D of the cabinet 10 relative to other part of the side panel 12. The board receiver 51 has a plurality of openings 17 made at a plurality of places and in a vertical layout in the board receiver 51.

The board receiver 51 further includes an engagement member 60 with a pair of hook tabs 61. The hook tabs 61 are provided to both longitudinal end portions of the board receiver 51 in the height direction H of the cabinet 10. The engagement member 60 is formed from resin integrally with the board receiver 51 as a one-piece, unitary member. Each of the hook tabs 61 has an elastic leg component (e.g., positioning member) 62 and an engagement prong (e.g., engagement member) 63. The leg components 62 stick out from the board receiver 51 in a width direction W of the cabinet 10. The engagement prongs 63 are formed at distal ends of the leg components 62, respectively. With the engagement member 60, spacing between the hook tabs 61 is set to match the length of the frame 20 of the control key unit A.

The front cabinet 11 further includes a plurality of ribs (e.g., support ribs) 71. Specifically, the ribs 71 are formed spaced apart at a specific distance. The ribs 71 are located on an inside corner portion a of the front cabinet 11, at a plurality of locations (three locations, for example) in the height direction H of the front cabinet 11.

The front cabinet 11 further includes a base component 70. The base component 70 is formed by top portions of the ribs 71. One of the ribs 71 located in the middle of the ribs 71 (e.g., middle rib) further has an engagement protrusion 72 protruding in the depth direction D relative to the top portion of the middle rib 71. The engagement protrusion 72 faces the board receiver 51 at a distance in the width direction W of the front cabinet 11, and integrally formed with the middle rib 71 as a one-piece, unitary member.

As shown in FIG. 5, the rear cabinet 15 includes a plurality of retainer ribs (e.g., retainer) 73. The retainer ribs 73 are located on the rear cabinet 15 at two locations in the height direction H of the cabinet 10.

Next, the attachment structure 2 of the control key unit A will be described in detail through reference to FIGS. 4 and 5.

With the control key unit A, the bottom plate 22 of the frame 20 is placed on the base component 70 of the front cabinet 11. Specifically, the bottom plate 22 of the frame 20 is disposed on top surfaces of the top portions of the ribs 71. The base component 70 is formed by the top portions of the ribs 71. As shown in FIG. 5, the engagement protrusion 72 of the middle rib 71 fits into a slit 28 provided to the bottom plate 22. Therefore, the engagement protrusion 72 serves to position the control key unit A in the height direction H and the width direction W of the frame 20.

As shown in FIG. 4, the frame 20 is fitted in between the hook tabs 61. The frame 20 is sandwiched by the leg components 62 of the hook tabs 61 and positioned in the height direction H of the front cabinet 11. Also, the engagement prongs 63 of the hook tabs 61 engage with the end plates 26 of the frame 20 in the width direction W of the frame 20. The engagement prongs 63 work in conjunction with the board receiver 51 of the front cabinet 11 to clamp the frame 20 in the width direction W of the front cabinet 11. Furthermore, as shown in FIG. 5, the engagement prongs 63 engage the protrusions 27 of the end plates 26 in the depth direction D of the cabinet 10. In other words, spacing between the top portions of the ribs 71 and the engagement prongs 63 in the depth direction D of the cabinet 10 is set to the length of the protrusions 27 in the depth direction D. The retainer ribs 73 of the rear cabinet 15 coupled to the front cabinet 11 contact with the wiring board 30 of the control key unit A. As a result, the retainer ribs 73 and the base component 70 of the front cabinet 11 work in conjunction to sandwich the frame 20 therebetween in the depth direction D.

When the control key unit A is attached to the front cabinet 11 of the cabinet 10, the control key unit A is positioned relative to the cabinet 10 in three mutually perpendicular axial directions of the cabinet 10, namely, the height direction H, the width direction W, and the depth direction D. Thus, the control key unit A can be precisely attached to the front cabinet 11 without the use of any attachment screws or other such extra parts.

As shown in FIG. 4, with the control key unit A attached to the front cabinet 11, the front panel 21 of the frame 20 is opposite the board receiver 51 and the side panel 12 of the front cabinet 11. The key tops 23 provided to the front panel 21 are inserted into the openings 17 made at a plurality of locations and in a vertical layout in the board receiver 51. Therefore, the appearance of the television receiver 1 equipped with the control key unit A can be aesthetically satisfying as shown in FIG. 6. Specifically, with the attachment structure 2, the key tops 23 provided to the control key unit A can be accurately aligned with the openings 17 in the front cabinet 11 of the cabinet 10.

The procedure for attaching the control key unit A to the cabinet 10 will now be described in detail.

The wiring board 30 is mounted on the frame 20 so that the wiring board 30 is sandwiched between the first rib array 24 and the second rib array 25. Then, the frame 20 is pushed in between the hook tabs 61 in a direction indicated by an arrow N shown in FIG. 1 while being placed on the base component 70. The leg components 62 of the hook tabs 61 deform elastically, allowing the frame 20 to fit in between the leg components 62. The engagement prongs 63 of the hook tabs 61 engage the protrusions 27 and the end plates 26 of the frame 20. Merely by performing this operation, the control key unit A is attached to the front cabinet 11 of the cabinet 10. Then, as shown in FIG. 5, the rear cabinet 15 is put together with the front cabinet 11 and coupled. The retainer ribs 73 of the rear cabinet 15 contact with the wiring board 30 of the control key unit A. Therefore, the retainer ribs 73 of the rear cabinet 15 work in conjunction with the base component 70 of the front cabinet 11 to sandwich the frame 20 therebetween in the depth direction D of the cabinet 10. The protrusions 27 also work in conjunction with the base component 70 to clamp the frame 20 between the hook tabs 61 and the base component 70 in the depth direction D of the cabinet 10. This concludes the process of attaching the control key unit A.

The engagement protrusion 72 located on the middle rib 71 on the front cabinet 15 is engaged with the slit 28 of the bottom plate 22 of the frame 20 of the control key unit A. Accordingly, when the key tops 23 are pushed in to operate the key switches 40, the engagement protrusion 72 prevents the frame 20 from warping away from the board receiver 51. As a result, there is no loss tactile feedback when the key tops 23 are pressed, and furthermore the operation of the key switches 40 can be carried out more reliably.

With the attachment structure 2, the structure of the control key unit A is not limited to the structure illustrated in FIG. 1.

With the attachment structure 2 for the control key unit A, the wiring board 30 is mounted on the frame 20 attached to the cabinet 10. The frame 20 has the key tops 23 that are operated by being pressed. The key switches 40 mounted on the wiring board 30 are located behind the key tops 23, respectively. The attachment structure 2 has the base component 70, retainer ribs 73, the board receiver 51 and the engagement member 60. The frame 20 of the control key unit A is placed on the base component 70. The retainer ribs 73 are located on the cabinet 10 and work in conjunction with the base component 70 to clamp the frame 20. The engagement member 60 is located on the cabinet 10 and engages with the frame 20 that has been placed on the base component 70. The board receiver 51 is formed by a part of the cabinet 10, and works in conjunction with the engagement member 60 to clamp the frame 20 in a direction that is perpendicular to a clamping direction of the base component 70 and the retainer ribs 73. The board receiver 51 includes the openings 17 that expose the key tops 23 on the outside of the cabinet 10. The engagement member 60 also positions the frame 20 with respect to the board receiver 51 in a direction that is perpendicular to both the clamping direction of the base component 70 and the retainer ribs 73, and the clamping direction of the engagement member 60 and the board receiver 51.

With the attachment structure 2, the base component 70 and the retainer ribs 73 work in conjunction to clamp the frame 20 of the control key unit A in the depth direction D of the cabinet 10. Also, the engagement member 60 and the board receiver 51 clamp the frame 20 in the width direction W of the cabinet 10. Furthermore, the frame 20 is positioned by the engagement member 60 in the height direction H of the cabinet 10. Therefore, there is no need to use attachment screws or other extra parts to attach the control key unit A to the cabinet 10. Also, because the control key unit A is positioned with respect to the cabinet 10 in three mutually perpendicular axial directions, the key tops 23 provided to the control key unit A are disposed in a state of being accurately positioned in the openings 17 formed on the cabinet 10.

With the attachment structure 2, the engagement member 60 has the hook tabs 61 with the elastic leg components 62 and the engagement prongs 63. The leg components 62 are integrally formed with the cabinet 10. Each of the engagement prongs 63 is formed at the distal end of each of the leg components 62. The leg components 62 clamp the frame 20. The board receiver 51 works in conjunction with the engagement prongs 63 to clamp the frame 20.

With the attachment structure 2, the control key unit A is temporarily fixed to the front cabinet 11 merely by utilizing the elasticity of the leg components 62 of the hook tabs 61 to fit the control key unit A in between the hook tabs 61, and engaging the engagement prongs 63 with the frame 20. The effect here is that the process of attaching the control key unit A to the cabinet 10 is simplified. Also, the leg components 62 of the hook tabs 61 position the frame 20. The board receiver 51 and the engagement prongs 63 of the hook tabs 61 work in conjunction to clamp the frame 20. Thus, the engagement member 60 includes both an element for forming the positioning member (the leg components 62 of the hook tabs 61) and an element that faces the board receiver 51 (the engagement prongs 63 of the hook tabs 61). Therefore, the attachment structure 2 becomes simpler than when these are constituted separately.

With the attachment structure 2, the cabinet 10 is divided into the front cabinet 11 and the rear cabinet 15 that is combined with the front cabinet 11. The base component 70 is formed by the top portions of the ribs 71 provided at a plurality of places in the front cabinet 11. The retainer ribs 73 are located on the rear cabinet 15 and hold down the wiring board 30 mounted in the frame 20. With this structure, the ribs 71 forming the base component 70 not only serve to clamp the frame 20 in conjunction with the retainer ribs 73, but also have the advantage of reinforcing the front cabinet 11. Also, while the ribs 71 forming the base component 70 are located on the front cabinet 11, the retainer ribs 73 are located on the rear cabinet 15. As a result, the control key unit A can be attached to the cabinet 10 merely by carrying out the ordinary assembly process for the cabinet 10, in which the control key unit A is temporarily fixed to the front cabinet 11, after which the rear cabinet 15 is coupled to the front cabinet 11.

With the attachment structure 2, the engagement protrusion 72 engages with the frame 20 and prevents the frame 20 from warping away from the board receiver 51. The engagement protrusion 72 is integrally provided to the middle rib 71. With this structure, the engagement protrusion 72 bears the load applied to the frame 20 when one of the key tops 23 is pressed. This prevents the frame 20 from warping. Accordingly, there is no loss of tactile feedback of the key top 23, or loss of operational stability of the key switches 40, that would otherwise result from warping of the frame 20.

As discussed above, with the attachment structure 2, it is possible for the control key unit A to be attached quickly and accurately to the cabinet 10 of the television receiver 1 without the use of attachment screws. Accordingly, the number of extra parts such as attachment screws is reduced, the components cost and assembly cost become correspondingly lower, and productivity becomes higher.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A control key unit attachment structure comprising:
   a control key unit including a wiring board, a key switch that is disposed on the wiring board and electrically coupled to the wiring board, and a frame with a push operated key top overlying the key switch with the frame being attached to a cabinet of a television receiver and supporting the wiring board, with the cabinet of the television receiver including a first cabinet member and a second cabinet member that is coupled to the first cabinet member, the first and second cabinet members being independently formed as separate members;
   a base component supporting the frame of the control key unit;
   a retainer located on the cabinet of the television receiver, the retainer and the base component sandwiching the frame of the control key unit in a first direction of the frame therebetween;
   an engagement member integrally formed with the first cabinet member of the cabinet of the television receiver, the engagement member engaging with the frame of the control key unit;

a board receiver integrally formed with the first cabinet member of the cabinet of the television receiver, the board receiver and the engagement member sandwiching the frame of the control key unit in a second direction of the frame therebetween such that the frame of the control key unit is non-movably attached to the first cabinet member of the cabinet of the television receiver in the second direction, with the second direction being perpendicular to the first direction of the frame, the board receiver having an opening through which the key top of the frame extends to an outside of the cabinet of the television receiver such that the key top of the frame is configured to operate the key switch of the control key unit in the second direction; and a positioning member positioning the frame of the control key unit with respect to the board receiver in a third direction of the frame with the third direction being perpendicular to both the first and second directions of the frame.

2. The control key unit attachment structure according to claim 1, wherein the first and second cabinet embers of the cabinet of the television receiver form front and rear cabinet members of the cabinet, respectively, the base component further includes a plurality of support ribs integrally formed with the front cabinet member of the cabinet at a plurality of locations of the front cabinet member of the cabinet, the frame of the control key unit being disposed on top surfaces of the support ribs, and the retainer further includes a plurality of retainer ribs integrally formed with the rear cabinet member of the cabinet, the retainer ribs pushing the wiring board of the control key unit against the frame of the control key unit in the first direction of the frame.

3. The control key unit attachment structure according to claim 2, wherein the base component further includes an engagement protrusion that is integrally formed with one of the support ribs of the base component, the engagement protrusion engaging with the frame of the control key unit and preventing the frame from warping away from the board receiver.

4. The control key unit attachment structure according to claim 3, wherein the engagement protrusion of the base component engages with a slit that is formed on a bottom plate of the frame of the control key unit.

5. The control key unit attachment structure according to claim 1, wherein the opening of the board receiver has a center axis that extends in the second direction of the frame.

6. The control key unit attachment structure according to claim 1, wherein the base component is integrally formed with the first cabinet member of the cabinet, the base component further includes a plurality of support ribs integrally formed with the first cabinet member of the cabinet at a plurality of locations of the front cabinet member of the cabinet, the frame of the control key unit being disposed on top surfaces of the support ribs, the base component further includes an engagement protrusion that is integrally formed with one of the support ribs of the base component, the engagement protrusion engaging with the frame of the control key unit and preventing the frame from warping away from the board receiver in the second direction of the frame, the second direction of the frame being parallel to an center axis of the opening of the board receiver, and the retainer further includes a plurality of retainer ribs integrally formed with the second cabinet member of the cabinet, the retainer ribs pushing the wiring board of the control key unit against the frame of the control key unit in the first direction of the frame.

7. The control key unit attachment structure according to claim 6, wherein the positioning member includes a pair of elastic leg components integrally formed with the first cabinet member of the cabinet of the television receiver, each of the leg components having a distal end portion, the elastic leg components sandwiching the frame of the control key unit therebetween in the third direction of the frame such that the frame of the control key unit is non-movably attached to the first cabinet member of the cabinet of the television receiver in the third direction, the engagement member includes a pair of engagement prongs, the engagement prongs being formed with the distal end portions of the leg components, respectively, and the board receiver and the engagement prongs of the engagement member clamp the frame of the control key unit therebetween.

8. A control key unit attachment structure comprising:

a control key unit including a wiring board, a key switch that is disposed on the wiring board and electrically coupled to the wiring board, and a frame with a push operated key top overlying the key switch with the frame being attached to a cabinet of a television receiver and supporting the with the cabinet of the television receiver including a first cabinet member and a second cabinet member that is coupled to the first cabinet, the first and second cabinet members being independently formed as separate members;

a base component supporting the frame of the control key unit with respect to the cabinet of the television receiver, the base component being integrally formed with the first cabinet member of the cabinet;

a retainer integrally formed with the second cabinet member of the cabinet, the retainer and the base component sandwiching the frame of the control key unit in a first direction of the frame therebetween;

an engagement member integrally formed with the first cabinet member of the cabinet of the television receiver, the engagement member engaging with the frame of the control key unit;

a board receiver integrally formed with the first cabinet member of the cabinet of the television receiver, the board receiver and the engagement member sandwiching the frame of the control key unit in a second direction of the frame therebetween with the second direction being perpendicular to the first direction of the frame, the board receiver having an opening through which the key top of the frame extends to an outside of the cabinet of the television receiver; and a positioning member positioning the frame of the control key unit with respect to the board receiver in a third direction of the frame with the third direction being perpendicular to both the first and second directions of the frame, the positioning member including a pair of elastic leg components integrally formed with the first cabinet member of the cabinet of the television receiver, each of the leg components having a distal end portion, the engagement member including a pair of engagement prongs, the engagement prongs being integrally formed with the distal end portions of the leg components, respectively, such that the engagement prongs are engaged with side plates of the frame in the second direction of the frame, respectively, and the board receiver and the engagement prongs of the engagement member sandwiching the side plates of the frame of the control key unit therebetween in the second direction of the frame.

9. The control key unit attachment structure according to claim 8, wherein the first and second cabinet members of the cabinet of the television receiver form front and rear cabinet members of the cabinet, respectively, the base component further includes a plurality of support ribs integrally formed with the front cabinet member of the cabinet at a plurality of locations of the front cabinet member of the cabinet, the frame of the control key unit being disposed on top surfaces of the support ribs, and the retainer further includes a plurality of retainer ribs integrally formed with the rear cabinet member of the cabinet, the retainer ribs pushing the wiring board of the control key unit against the frame of the control key unit in the first direction of the frame.

10. The control key unit attachment structure according to claim 9, wherein the base component further includes an engagement protrusion that is integrally formed with one of the support ribs of the base component, the engagement protrusion engaging with the frame of the control key unit and preventing the frame from warping away from the board receiver.

11. The control key unit attachment structure according to claim 10, wherein the engagement protrusion of the base component engages with a slit that is formed on a bottom plate of the frame of the control key unit.

12. The control key unit attachment structure according to claim 9, wherein the support ribs of the base component are located between the leg components of the positioning member in the third direction.

\* \* \* \* \*